United States Patent [19]

Holub et al.

[11] 4,269,755

[45] May 26, 1981

[54] COMPOSITION COMPRISING AROMATIC POLYCARBONATE AND PASSIVATED WOLLASTONITE FILLER PARTICLES

[75] Inventors: Fred F. Holub, Schenectady, N.Y.; Gerald F. Macke, Mount Vernon, Ind.

[73] Assignee: General Electric Company, Pittsfield, Mass.

[21] Appl. No.: 105,724

[22] Filed: Dec. 20, 1979

[51] Int. Cl.$^3$ .............................................. C08L 69/00
[52] U.S. Cl. ................................................ 260/37 PC
[58] Field of Search ............... 260/40 R, 37 PC, 42.14

[56] References Cited

U.S. PATENT DOCUMENTS 3,360,498  12/1967  Rawlings ......................... 260/37 PC
4,070,330  1/1978   Rawlings ......................... 260/37 PC

FOREIGN PATENT DOCUMENTS 1441367  6/1976  United Kingdom ................ 260/37 PC

OTHER PUBLICATIONS

Modern Plastics Encyclopedia; 1977–1978, McGraw-Hill Inc., N.Y.; p. 183 ff.
The Encyclopedia of Polymer Science and Technology, vol. 10, NY; 1969; pp. 710–764.
The Encyclopedia of Polymer Science and Technology, vol. 6, NY; 1967; pp. 209–271.

*Primary Examiner*—Lewis T. Jacobs
*Attorney, Agent, or Firm*—Morgan, Finnegan, Pine, Foley and Lee

[57] ABSTRACT

The affinity of wollastonite filler particles for thermoplastic aromatic polycarbonates is improved when the surface of the particles is passivated by a combined content of a aryl epoxy compound. Thermoplastic molded products containing such particles possess superior modulus, and very satisfactory tensile strength, impact strength and elongation, with a substantial saving in cost.

10 Claims, No Drawings

COMPOSITION COMPRISING AROMATIC POLYCARBONATE AND PASSIVATED WOLLASTONITE FILLER PARTICLES

The present invention relates to polycarbonate resins filled with wollastonite filler particles of improved surface characteristics.

BACKGROUND OF THE INVENTION

Wollastonite particles have long been employed as filler material in the manufacture of thermoplastic molding compositions (Modern Plastics Encyclopedia 1977–1978, McGraw-Hill Inc., New York, N.Y.), p. 183 ff. By use of these particles, which are inexpensive, compounders of thermoplastic molding compositions have found it possible to effect a major decrease in the cost of their molding compositions with no more than a minor sacrifice in the principal physical properties of the molded pieces obtained. However, a demand has arisen for particles which would cause even less of a decrease in physical properties, and the present invention is directed to this problem.

Wollastonite is a native mineral (a calcium metasilicate of the pyroxane group), and is hydrophilic. When crushed it provides particles which are acicular in shape and which are heat and abrasion resistant. The particles which are between 1μ and 1000μ in length (and preferably between 1μ and 40μ in length) are the fraction which is used as filler in the compounding of thermoplastic molding compositions.

The discovery has now been made that the surface of wollastonite filler particles carries reactive sites and that the affinity of these particles for aromatic polycarbonate resins is improved when the particles have been treated with an aryl epoxy compound as is more particularly described below, so as to provide the particles with a surface which is passive.

The further discovery has been made that the coatings of the thus-treated particles are thermostable in that they do not appear to decompose in the temperature range (400°–550° F.) at which compounding of aromatic polycarbonate molding compositions customarily takes place.

The nature of the aforesaid reactive sites, the manner in which the aryl epoxy compounds inactivate these sites or passivate the surface of the particles, and the cause of the improved affinity of the treated particles for aromatic polycarbonate polymers have not been ascertained, and applicants do not wish to be bound by any theory.

In its broadest scope, therefore the present invention provides aromatic polycarbonates in combination with novel wollastonite filler particles, said particles carrying in combined state a small but effective amount, in the range of 0.01% to 10%, of the weight of the particles, of an aryl epoxy compound as agent improving the modulus and other properties of the thermoplastic composition.

The invention further provides a thermoplastic molding composition wherein an aromatic polycarbonate is the principal structural component and the composition has a uniformly distributed content, in the range of 0.1% to 400% of the weight of said polymer, of the above-described treated wollastonite particles.

For convenience, hereinafter the aryl epoxy compound on the particles will be described as being "combined" therewith, and it will be understood that this term will describe the manner of combination whether it be by reaction, by hydrogen bonding, by absorption, or otherwise.

The aryl epoxy compounds with which the wollastonite particles are treated, are those aryl epoxy compounds, monomeric or polymeric, which can be deposited on the particles in fluid state and which combine with the particles so as to render their surfaces passive or inert. Two or more epoxy groups should be present. In the case of polymers, the density of epoxy groups should be between 0.1 and 4 epoxy groups per functional unit.

Suitable polymers include those prepared from A-stage phenol-formaldehyde condensation products and epichlorohydrin, and the linear polymer prepared from p-vinylphenol and epichlorohydrin. The aryl ring may be phenyl, naphthalene or phenanthrene.

In practice the monomeric reaction product of epichlorohydrin with bisphenol-A having the theoretical formula:

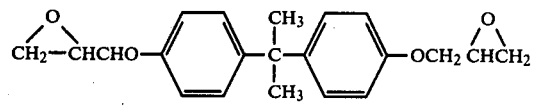

is preferred as this compound is readily prepared from inexpensive materials and has an epoxy density of 2. It is available, e.g., from Dow Chemical Co. under the tradename DER 332.

It is advantageous to employ the epoxy treating agent in moderate (10% to 20%) excess, to ensure that substantially all the surfaces of all the particles are rendered passive. The amount of excess needed for the purpose varies from sample to sample of wollastonite and with the epoxy density of the treating agent. The minimum amount of excess in any instance is therefore most conveniently found by making a series of laboratory trials. Extraction of the treated dry wollastonite with an inert solvent for the epoxy compound reveals that the amount of epoxy compound which is retained by the wollastonite is small, and is usually in the range of 0.01% to 3% of the dry weight of the particles. Evidently, then, the coating may be monomolecular or even less, and in any event is very thin.

Any method for applying the epoxy compound to the wollastonite particles can be utilized which causes uniform distribution of the agent as a fluid coating over the surfaces of the particles and which provides conditions under which the epoxy compound can combine with the active sites on the surfaces of the particles.

Thus one feasible method is to heat a batch of wollastonite filler particles to a temperature at which the treating agent is fluid and then to add the treating agent and the wollastonite to an extruder mixer of a conventional type which provides shear. Slow mixing is effected over a long period of time to ensure complete coating of the particles and passivation of the active sites thereon.

A more rapid method is to employ a volatile inert liquid as solvent and carrier for the treating agent. According to this method the treating agent is dissolved in a small amount of an appropriate solvent and the solution is added to the wollastonite batch which is to be treated, following which enough more solvent is added to provide a slurry of whatever consistency is desired. Preferably sufficient solvent is added so that there is a continuous liquid phase. The mixing may be and preferably is performed at room temperature. The solvent is then removed by use of vacuum so as to deposit the epoxy compound uniformly on the particles, after which the batch is heated to a reaction temperature (usually in the range of 75°-200° F.) and allowed to age until the epoxy compound has combined with active sites as aforesaid.

Following either method, any excess (uncombined) epoxy agent can be removed. This can be done by extracting the batch with an inert solvent, preferably at an elevated temperature to facilitate separation of the excess from the particles. In most instances, however, and especially when only a small excess of the treating agent is present, the removal step is unnecessary because the excess dissolves in the molten structural polymer or decomposes or volatilizes during the compounding step. In any event, allowing the unreacted excess epoxy compound to remain in the filler batch does not appear to have a detrimental effect on the strength and impact resistance of articles molded from the composition.

Aromatic polycarbonate polymers which are suitable for use as the structural component of the molding compositions of the present invention are well known and are described, for example, in The Encyclopedia of Polymer Science and Technology, Vol. 10, New York, 1969, pages 710–764.

Preferred are the polyaromatic polycarbonates represented by the polymer known as Lexan (manufactured by the General Electric Co., Pittsfield, Mass.) which is substantially composed of units derived from bisphenol-A and phosgene, and having the theoretical formula

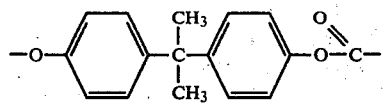

Also useful are the di- and tetrabromo and the di- and tetramethyl derivatives thereof.

Furthermore those skilled in the art can easily substitute polycarbonate blends with conventional, compatible resins, polycarbonate ester copolymers, polycarbonate siloxane copolymers, and the like. See the above-mentioned literature reference incorporated herein by reference.

The epoxy compounds and structural polymers which have been mentioned above can be employed in admixture with other respectively similar polymers which are now known or which may hereafter be devised. The epoxy compounds are described in The Encyclopedia of Polymer Science and Technology, Vol. 6, Interscience, New York, 1967, pages 209–271, incorporated herein by reference.

The compositions of the present invention may and usually do contain one or more of the auxiliary components which are customarily present in present-day commercial molding compositions. These components include pigments; ultraviolet ray absorbers; flame retardants of any suitable type including potassium diphenyl-sulfone-3-sulfonate and sodium 2,4,5-trichlorobenzene-sulfonate; plasticizers; supplementary fillers; foaming agents; and fibrous strengtheners for example, glass and asbestos fibers.

The proportions in which these auxiliary components are employed, and their manner of compounding with the structural polymer or polymers are conventional and are not features of the invention.

After the compounding step the compositions of the present invention can be prepared as a homogeneous free-flowing particulate product by extruding the melt containing the aromatic polycarbonate, the filler and auxiliary agents in the form of strands, cooling the strands until solid, and comminuting the strands to a desired particle size. The resulting product can be fed directly into an injection or compression molding machine.

The invention is further illustrated by the example which follows. This example is the best embodiment of the invention, and is not to be construed in limitation thereof.

EXAMPLE

Acicular wollastonite, having a size distribution of particles between $1\mu$ and $40\mu$, is coated with the reaction product of 2 moles of epichlorohydrin and 1 mole of bisphenol-A, known as Dow Chemical Co's. DER 332. The coating is done by the following method:
1. 50 grams of wollastonite is placed in a 500 ml. round bottom flask to which is added 5 g. of DER 332 and 100 ml. of dichloromethane.
2. The resulting slurry is agitated to ensure complete wetting of the filler.
3. The flask is then connected to a vacuum and partially submersed in a mineral oil bath.
4. While the flask is continually turning, the bulk of the dichloromethane is removed under vacuum; and lumps are broken up periodically.
5. After the dichloromethane is removed, the oil bath is heated to 200° C. and allowed to remain at that temperature for 30 minutes.
6. The contents are removed from the flask and any remaining lumps are broken up, resulting in a free-flowing filler.

The weight of epoxide coated on the wollastonite filler is 10 parts per 100 parts by weight of coated filler.

In an extruder at 480° F. are melt blended 100 parts by weight of an aromatic polycarbonate resin of bisphenol-A and phosgene, known as General Electric Co's. LEXAN 100, and 10 parts by weight of the wollastonite filler coated with epoxy resin. The extrudate is comminuted into molding granules. It has a KI melt viscosity of 4210 (6 min.) and 3430 (12 min.).

Standard test pieces are injection molded from the composition in a 3 oz. screw injection molding machine at 570° F. (cylinder).

The physical properties observed are:

| | |
|---|---|
| Tensile strength, psi | 9370 |
| Elongation at break, % | 16 |
| Flexural Strength, psi | 13,500 |
| Modulus, psi | 382,000 |
| Unnotched Izod impact strength, ft.lbs./inc. | >38.7 |

The elongation is noteworthy, being better than glass reinforced polycarbonate. The modulus is high. Such a composition is eminently suitable for the manufacture of camera housings.

Many variations will suggest themselves to those skilled in this art in light of the above, detailed description. For example, instead of 10 parts, there can be used 40 and, by the use of solvents, 100, 200, 300 and 400 parts by weight of the coated filler per 100 parts by weight of the aromatic polycarbonate; those are suitable for compression-molding. An epoxylated novolac resin can be substituted for the epoxylated bisphenol-A. The polycarbonate of bisphenol-A and phosgene can be replaced in whole or in part with a polycarbonate of tetramethylbisphenol-A and phosgene, or of tetrabromobisphenol-A and phosgene, or the corresponding copolycarbonates or a copolyestercarbonate of adipic acid, bisphenol-A and phosgene, or a copolymer of bisphenol-A, phosgene and a siloxane derivative, and the like.

The foregoing detailed descriptions will suggest many variations to those skilled in this art. All such obvious variations are within the full intended scope of the appended claims.

We claim:

1. A composition comprising an aromatic polycarbonate resin and an effective, modulus- and surface-improving amount of wollastonite filler particles carrying in combined state a small but effective amount, in the range of 0.01% to 10%, of the weight of said particles, of an aryl epoxy compound as agent improving the affinity of said particles for said aromatic polycarbonate.

2. Particles according to claim 1 wherein the aryl epoxy compound is an epichlorohydrin-bisphenol-A condensate having the theoretical formula:

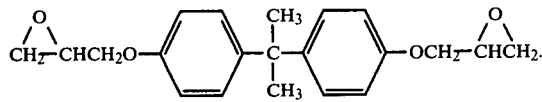

3. A composition according to claim 1 wherein the weight of said aryl epoxy compound is between 0.1% and 10% of the weight of said particles.

4. A composition according to claim 1 wherein said particles are acicular in form.

5. A composition according to claim 1 wherein said particles size is between $1\mu$ and $1000\mu$.

6. A composition according to claim 1 wherein said particles have substantially no active surface sites.

7. A composition according to claim 1 wherein said particles have substantially no uncombined aryl epoxy compound.

8. A composition according to claim 1 having a uniformly distributed content in the range of 0.1% to 400% based on the weight of said polymer, of said wollastonite filler particles.

9. A molding composition according to claim 8 wherein the thermoplastic aromatic structural polymer is a polycarbonate substantially composed of units having the theoretical formula

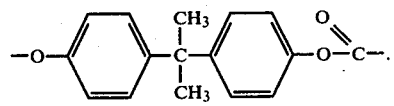

10. A molding composition according to claim 8 wherein the weight of said particles is between 0.1% and 20% of the weight of said polymer.

* * * * *